United States Patent [19]

Bean et al.

[11] 4,104,617

[45] Aug. 1, 1978

[54] CONTROL PANEL SYSTEM

[75] Inventors: Lawrence M. Bean, Ellicott City; Robert W. Edwards, Glen Burnie; Theodore Wright, Crownsville, all of Md.

[73] Assignee: Westinghouse Electric Corp., Pittsburgh, Pa.

[21] Appl. No.: 761,165

[22] Filed: Jan. 21, 1977

[51] Int. Cl.² ............................................. G06F 3/02
[52] U.S. Cl. ............................. 340/147 R; 340/337; 364/900
[58] Field of Search ................ 340/163, 147 R, 172.5, 340/324 R, 337; 250/549; 445/1

[56] References Cited

U.S. PATENT DOCUMENTS

| | | | |
|---|---|---|---|
| 3,189,889 | 6/1965 | Bridgitt | 340/324 R |
| 3,256,516 | 6/1966 | Melia | 340/172.5 |
| 3,292,489 | 12/1966 | Johnson | 340/324 UX |
| 3,443,332 | 5/1969 | Christy | 340/324 UX |
| 3,768,073 | 10/1973 | Rawson | 445/1 |

*Primary Examiner*—Harold I. Pitts
*Attorney, Agent, or Firm*—H. W. Patterson

[57] ABSTRACT

A solid state control panel system utilizing optical coupling between a graphic control panel and a hand-held probe is disclosed. Separate light emitting control diodes and display diodes are utilized on the graphic panel. In response to a coded optical coupling between selected light emitting diodes on the panel and a light sensitive diode in the probe, various switching functions are performed. The system provides three different types of coding for each complete switching operation, namely, time coding, polarity, and pulse sequence coding. The probe includes means to inform the operator when proper optical coupling occurs; and is so constructed mechanically that it can be operated by pressure engagement with the panel, or as a gun. The system is structured to provide various types of switching functions, including the provision for selecting any one of a plurality of individual switches in its present state for display and control with each selected switch having a multiplicity of states. Once selected, the system provides for sequencing the selected switch functions from its last operated state to its next sequential state. Provisions are included for automatically driving the individual switches or control groups to their last operated state automatically.

13 Claims, 10 Drawing Figures

CONTROL PANEL SYSTEM

BACKGROUND OF THE INVENTION

1. Field of the Invention

The invention relates to control panel systems; and more particularly, to a control panel system which employs optical coupling between a light sensitive probe and light emitting means on the panel to select and change switch states.

2. Description of the Prior Art

Electrical systems which are to be controlled by an operator, have traditionally employed control panels, having mechanical switches for manipulation by an operator in a predetermined fashion, for changing the state of associated electrical circuits. Such mechanical switches not only provide the operator with a mechanical and visual interface with the system; but also, serve to inform the operator as to the present controlled state of the electrical system. Incandescent or neon lights, cathode ray tubes (CRT's), and light emitting diodes (LED's), for example, have been employed to display switch or control states and other information to the operator, such as the condition of a particular circuit, and whether the change of state desired by the operator has actually taken place. The number of switches and displays which could be installed on such a conventional control panel has been limited by the physical size and spacing of its components.

With the availability of standard commercially available light emitting and light sensitive diodes, it is possible to change the state of a circuit by optical coupling to perform the functions heretofore performed by mechanical switches.

Heretofore, hand-held light sensitive devices have been proposed to operate in cooperation with a control panel CRT and LED display systems to allow the operator to select (or address) a control input to the system without the need for a mechanical interface at each control location. However, as far as is known, previously proposed, optical coupling control panel systems have presented problems in reliability and ease and certainty of operation which are not present in mechanical switching systems. For example, extraneous light can result in inadvertent switch operation. A loss of power can destroy the states of the various switches. The active act of coupling can prevent operator observance of the change of state. The operator can inadvertently operate a switch easily to an undesired state. Thus, it is desirable to provide a control panel system utilizing all of the advantages of a solid state control system as compared to a conventional mechanical type control panel, while still maintaining the reliability, and ease and certainty of operation of conventional mechanical switch type control panel systems. Also, it is desirable to provide such a system which provides versatility of operation, has low power requirements, and provides compactness of display, which, in many instances, are not practicable for conventional systems.

SUMMARY OF THE INVENTION

Briefly, the present invention relates to a control panel system including a panel portion having a plurality of identifiable control groups. The state of each control group is displayed via a visible light emitting means; and the state of each control group is switched through the optical coupling of a light emitting means spaced from the indicating or display means, and a light sensitive means attached to a hand-held probe.

An escapement circuit senses such optical coupling and operates to effect a change in the associated optically coupled control group upon the operation of a trigger on the probe. The operation of the probe trigger varies the output signal from the optical coupling to the escapement circuit. Also, the system provides for indicating such optical coupling irrespective of the operation of the probe trigger. The probe is constructed to be triggered by either placing it in pressure contact with the panel or manipulating the trigger while spaced a predetermined distance from the panel.

More specifically, the probe photo-transistor converts sensed coded infrared pulses into coded electrical signals which do not affect the switching state while the probe switch is in the "trigger-off" position. In one aspect, when the probe switch is in the "trigger-on" position, the polarity of the coded electrical signals is changed; and a single pulse is output from the escapement circuit to change the state of a control or switch by one step. In another aspect, when the probe trigger is actuated, the escapement circuit provides for repetitive outputs to maintain a particular switch in an operated state only while the optical coupling is maintained.

A repetitive sequence of coded electrical pulse signals and synchronizing signals corresponding to the number of control groups in the system is provided. Each coded sequence and synchronizing signal is successively delayed during each repetitive cycle, with each delay corresponding to a particular control group. The output from the escapement circuit in response to trigger actuation is synchronized in accordance with the particular control group to be switched. The last operated switch state is stored in a non-volatile memory, and the system provides for automatically and repetitively checking agreement between the actual switch states and the memory, and drives the actual switch state to that stored in the memory.

DESCRIPTION OF THE PREFERRED EMBODIMENTS

Figure 1:
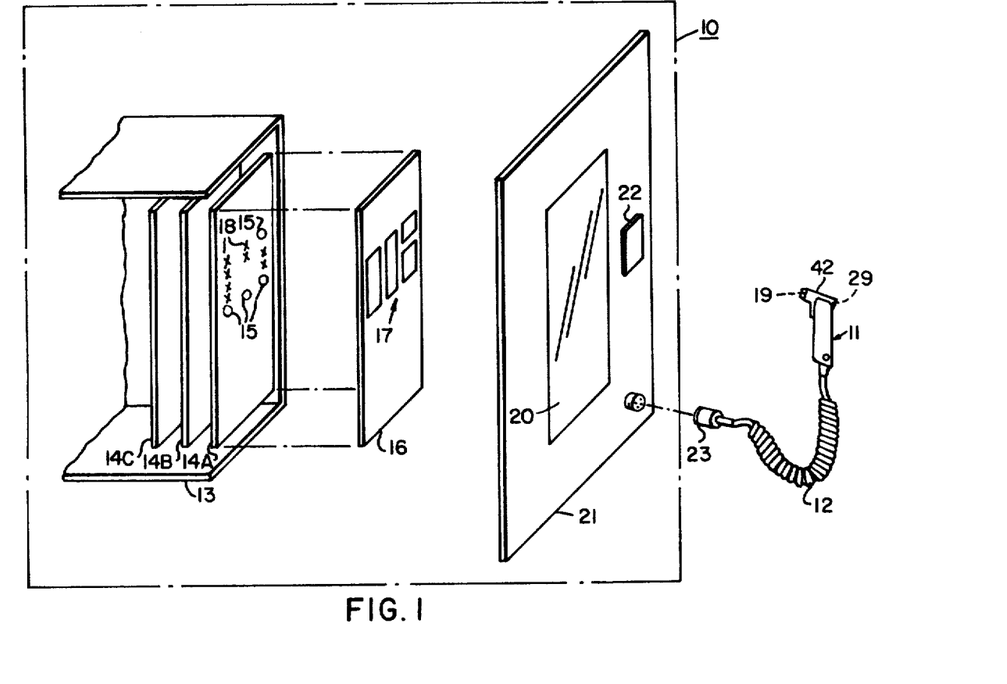
FIG. 1 is a drawing of an exploded fragmentary perspective overall view of the control panel assembly according to one embodiment of the invention.
Figure 2:
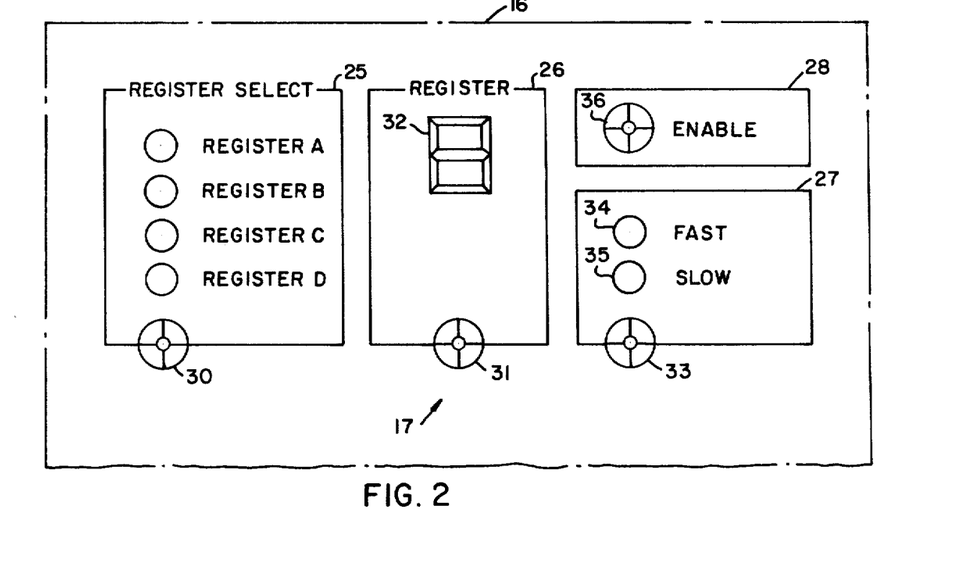
FIG. 2 is a front view of the graphics of a representative portion of a typical control panel in accordance with one embodiment of the invention.

Referring to FIG. 1, the solid state control panel system of the present invention is comprised of a control panel 10 to which is removably connected a hand-held probe 11 by an unshielded flexible cord 12. Equipment enclosure 13 contains a number of logic cards such as 14A, 14B, and 14C which are replaceable printed circuit or machine wired cards. The single logic card 14A, which is adjacent to a window 16 that includes graphics 17, contains control panel switching logic hereinafter described, address infra-red light emitting control diodes such as referred to at 15 which emit infrared illumination invisible to the human eye when energized, and switching-state display diodes such as referred to at 18 which emit visual-red illumination when energized. The remaining cards 14B and 14C are utilized for control purposes depending on the particular use of the panel and may include more or less than those illustrated in the fragmentary enclosure 13. The window 16, in front of and adjacent to one face of the logic card 14A, is constructed in a well-known manner to pass the infrared and visible-red illumination of the energized diodes 15 and 18, respectively. The illuminated visible display diodes 18 are for operator information. The energized invisible infrared control diodes 15, when energized, are sensed by a phototransistor 19 in the hand-held control probe 11 hereinafter described. All other parts of logic card 14A are shielded from view because of the construction of the window 16. White silk screen graphics 17 as shown in FIG. 2 are typical of the graphics on the outside surface of the window 16 to identify the location of each visible and infrared light source. A clear protective window 20 is located in a front panel 21 to protect the logic cards 14A, 14B, and 14C, as well as the graphics in window 16 from the external environment. The probe 11 may be supported normally by a magnetic probe holder 22 when not in use. A conventional electrical plug connector 23 is attached to the cord 12 for removably connecting the probe 11 to the system.

Referring to FIG. 2, the graphic display illustrates an arrangement of four control groups 25, 26, 27, and 28, respectively, on the mask or window 16. Control group 25 contains an address target circle 30 which is aligned with one of the infrared address control diodes 15 on the logic card 14A. The control group 25 provides for indicating and selecting any one of four different switches for display and subsequent control. Any one of the switches referred to as Register A, B, C, or D can be in a selected state for control and display. The visible location of an illuminated display diode 18 indicates to the operator the selection of one of the respective Registers A, B, C, or D. The control group 26 which contains an address target circle 31, represents the selected switch of either register A, B, C, or D and provides for controlling the selected switch and displaying its controlled state to any one of ten sequential positions, for example; a numerical display 32 is illuminated to indicate the operated state of the selected switch. The control group 27, which contains a target circle 33 acts as a two-position switch with states, such as "FAST" or "SLOW," for example. The graphics 34 and 35 are aligned with the associated display diodes 18. The target circles 30, 31, 33 and 36 when aligned with the probe sensor 19 permit the changing of the switch states of its respective group. When so aligned a visible display 29 on the probe 11 is illuminated.

The control group 28, which contains target circle 36, functions similar to a momentary pushbutton switch; that is, the switch is operated to a single state as long as the proper optical coupling is maintained and trigger is "ON". It is noted that control group 28 does not have a separate visual-red panel display associated therewith. Its switch-state is indicated by the intensity of the visual-red display indicator diode 29 on the probe 11. The indicator diode 29 normally is illuminated when the probe is properly aligned with and in close proximity to a target circle, as previously mentioned; however, when the probe 11 trigger is "on," the intensity of the indicator diode 29 changes to indicate the state of control group 28.

Figure 3:
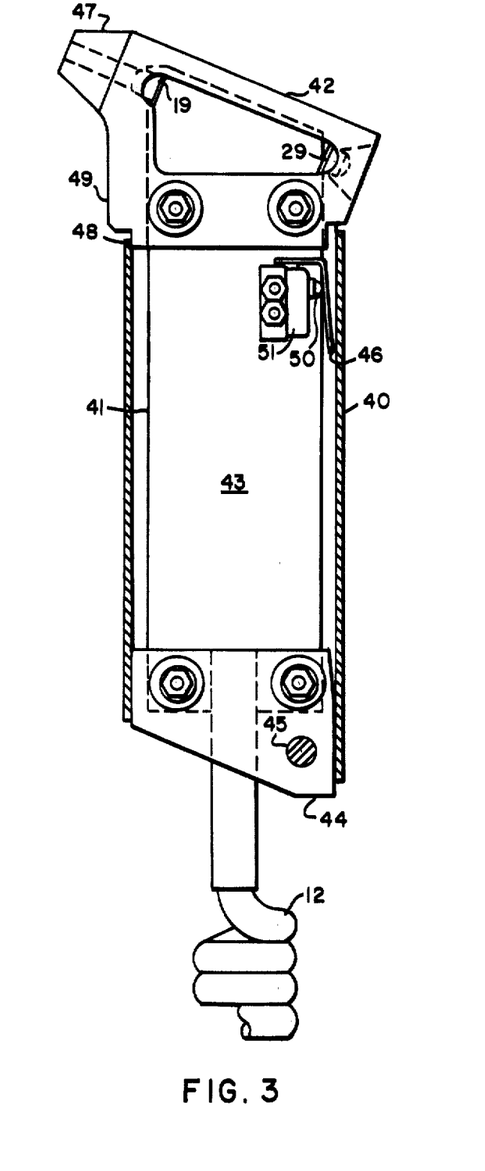
FIG. 3 is a sectional view of the probe assembly.

Referring to FIG. 3, the probe 11 is comprised of an outside hollow handle sleeve 40, which is grasped by the operator. An inner assembly 41 that includes a probe trigger assembly 42 fastened to a printed circuit board 43 which, in turn, is fastened to bracket 44. The cable 12 is also connected to components on printed circuit board 43. The inner assembly 41 is pivotally connected at one end in the sleeve 40 by a screw 45, which permits the inner assembly 41 to pivot in the handle sleeve 40. A switch operating spring 46 urges the inner assembly 41 downward as shown in the drawing such that edge 48 of the assembly 42 normally bears against the inner surface of the handle 40. When pressure is applied upwardly (as shown in the drawing) such as by pressing against a resistant surface, such as the window 20, or, in the alternative, in response to the operator pressing his finger against a probe trigger surface 49 of the trigger assembly 42, a pressure switch button 50 is depressed by the spring 46, thus causing a mechanical switch 51 to close. When the pressure is removed, spring 46 causes the inner assembly 41 to pivot back to its normal position in the handle sleeve 40; and the switch 51 opens. The conventional phototransistor infrared light sensor 19 (see FIG. 1) is mounted at the inner end of a relatively long cylindrical passage in the probe nose 47 to sense the infrared control diode illumination when the nose 47 of the probe 11 is placed in close proximity to and aligned with any of the address target circles, such as 30, 31, 33, or 36 (see FIG. 2); and converts the infrared illumination, from the control diodes 15, into an electrical signal. The visualred diode 29 is illuminated by a feedback signal from the control panel for the purpose of informing the operator that the probe is properly positioned. The flexible cord 12 provides the electrical connection between the printed circuit board in the probe 11 and the circuits on card 14A hereinafter described.

Figure 4:
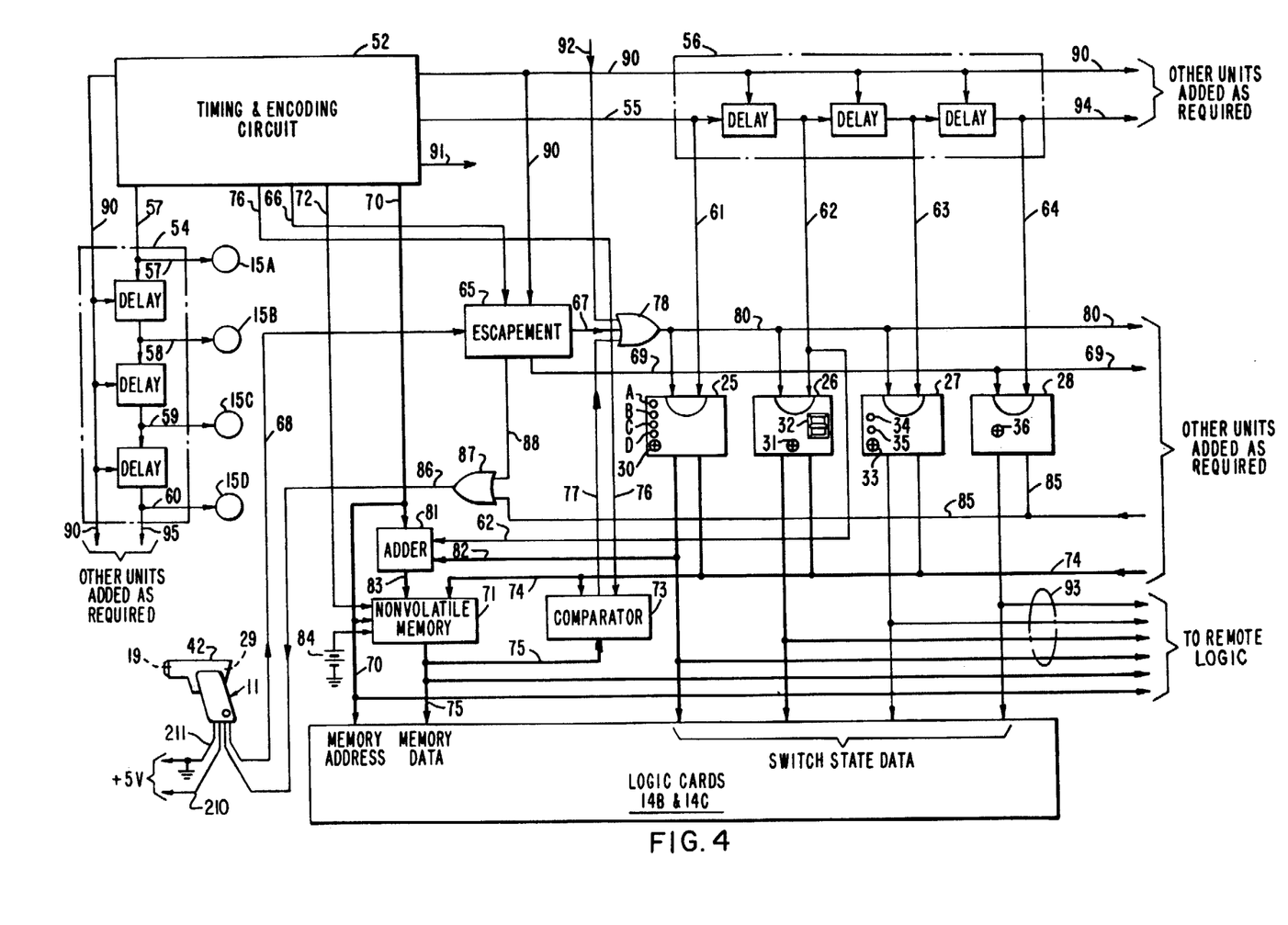
FIG. 4 is a schematic block diagram of the overall structure and function of the circuitry of the control panel system.

The overall organization and function of the system as shown in FIG. 4 includes an encloding and timing circuit referred to at 52 which generates the required code and timing pulses for operation of the control panel system. The circuit 52 generates an eight-bit code at a 78 Hz rate of line 53 (see FIG. 5) for input to a transmit shift register 54; and generates synchronous pulses at a similar rate, such as 78 Hz, for example, on line 55 to a receive shift register 56. The synch pulses on the line 55 are delayed by the circuit 52 to occur simultaneously with the last pulse of each code sequence. The transmit register 54 is a delay means for generating over parallel outputs 57, 58, 59, and 60 the received sequence code, except that the beginning of each code is delayed a predetermined interval on successive lines 57 through 60. For example, the beginning of the code on line 58 is delayed a predetermined interval from the code on line 57. The sequence code is converted to infrared pulses by control diodes 15A, B, C, D, which diodes are aligned with target circles 30, 31, 33, and 36, respectively.

The receive shift register 56 is provided to generate over parallel outputs 61, 62, 63, and 64 78 Hz synchronous pulses, each of which is delayed a predetermined interval from the preceding pulse. For example, the pulse on line 61 occurs coincidentally with the last bit of each sequence code on line 57; the pulse on line 62 occurs coincidentally with the last bit of each sequence code on line 58, etc.; so that each of the pulses from the register 56 coincides at the proper time with a corresponding sequence code on lines 57, 58, 59, and 60.

An escapement circuit 65 is provided to generate a single output pulse on line 67 in response to the proper reception of a sequence code followed by a single actuation of the trigger assembly 42 of the probe 11, for the control groups 25, 26, and 27; and generates a series of output pulses on line 69 following the reception of each sequence code as long as the trigger assembly 42 is maintained in its "ON" position for the control group 28. The timing circuit 52 also generates an output 66, a pulse which causes the output of the circuit 65 to occur at the proper time in response to the probe trigger "on" condition. This pulse may be referred to as a manual clock pulse. The sequence codes, which are sensed by the sensor 19 of the probe 11, when aligned with the diodes 15A, B, C, or D at their respective target circle 30, 31, 33, and 36 are transmitted to the circuit 65 over a single line 68, regardless of the "on" or "off" condition of the trigger 42 of the probe 11.

The circuit 52 also generates an output 70, bit address pulses at a predetermined rate to address each location of a non-volatile memory 71 in sequence. Each control group of the system has fixed memory locations in the memory 71. The memory 71 also has input from the circuit 52, over line 72, which outputs to the memory, so-called write pulses which occur at the same rate as the bit address pulses on line 70 to write in the state of each control group, sequentially and repetitively. Each of the control groups are so addressed once during each 78 Hz period for example.

A comparator 73 is provided to compare the control state of each address in the non-volatile memory 71 with the actual state of the corresponding control groups 25, 26, and 27. The actual state of such groups is input to the comparator 73 and the memory 71 over line 74. The memory 71 outputs the state for each address over line 75 to the comparator 73. The circuit 52 circuit also generates pulses on line 76 to the comparator 73, so that during the occurrence of each receiver pulse on 61, 62, and 63, change pulses on line 77 force the respective control group state to agree with the state stored in the memory 71.

During the dwell time on each address, the comparator 73 generates an output over line 77 to an "OR" gate 78 and over line 80 to the control groups 25, 26, and 27 provided there is disagreement and forces the addressed group to change.

An adder 81 is provided to prevent a display on group 26 to occur except for the selected register A, B, C, of D of control group 25. Thus, during each address scan, the control state of group 26 will be displayed only for the selected register of group 25. This is accomplished by adding a particular offset number to the bit address input of line 70. The particular bit number to be added is input over line 82 and depends on which register A, B, C, or D is selected. The input on line 62 is provided so that such address offset occurs at the proper time. This offset is input to the memory 71 over line 83.

The system is returned to its last operated state, after a power supply interruption has occurred, for example, through the arrangement of the comparator 73 and the memory 71 in conjunction with a standby battery 84. The battery 84 insures that the control states will remain stored in the memory 71 throughout a power supply interruption. Upon the resumption of power, the system will scan each address as previously mentioned; and the "high" or "low" state of the pulses over the line 77 operates to illuminate each display according to its last controlled state. It is to be noted that the state of group 28 is always "off" except when the probe 11 is properly aligned and triggered to its "on" condition.

The control group 28 has an output 85, which is connected to the probe 11 over line 85 and 86 through an "OR" or adder gate 87. When a signal is input to the probe 11 over the line 85, with the trigger assembly 42 "on," the indicator light 29 is intensified, as previously mentioned. The normal illumination of the light 29 is output on line 68 when the probe is properly aligned for any target circle 30, 31, 33 or 36.

The output pulses from the circuit 52 over line 90 are utilized in synchronizing the registers 54, 56. The system of the present invention may be remotely controlled by synchronizing such remote operation with the control panel system of the present invention. For example, a synchronizing output can occur on line 91 as input to the pivotally operated panel and an escapement circuit similar to 65 for the remote panel may provide an output to the "OR" gate 78 over a line 92 for changing the state of the control groups 25, 26, and 27. The operated or switched states of each group may be output over lines 93 to other remote location logic cards. The logic cards 14B and 14C as previously described provide the control for operating apparatus or circuit conduits as previously mentioned. Such cards may include a memory address input over the line 70, and such stored data can be input from the memory 71 over the line 75. The switching state data is input for apparatus control over the line 93 portions that are input to the logic cards 14B and 14C as shown in FIG. 4. Other control groups similar to 25, 26, 27, and 28 may be added to the system over the lines 80, 69, 85 and 74 in an obvious manner. As also shown in FIG. 4, other delay registers such as 56 may be connected on line 90 over line 94; as well as including other control diodes and delays, such as register 54 on lines 90 and 95.

Figure 9A:
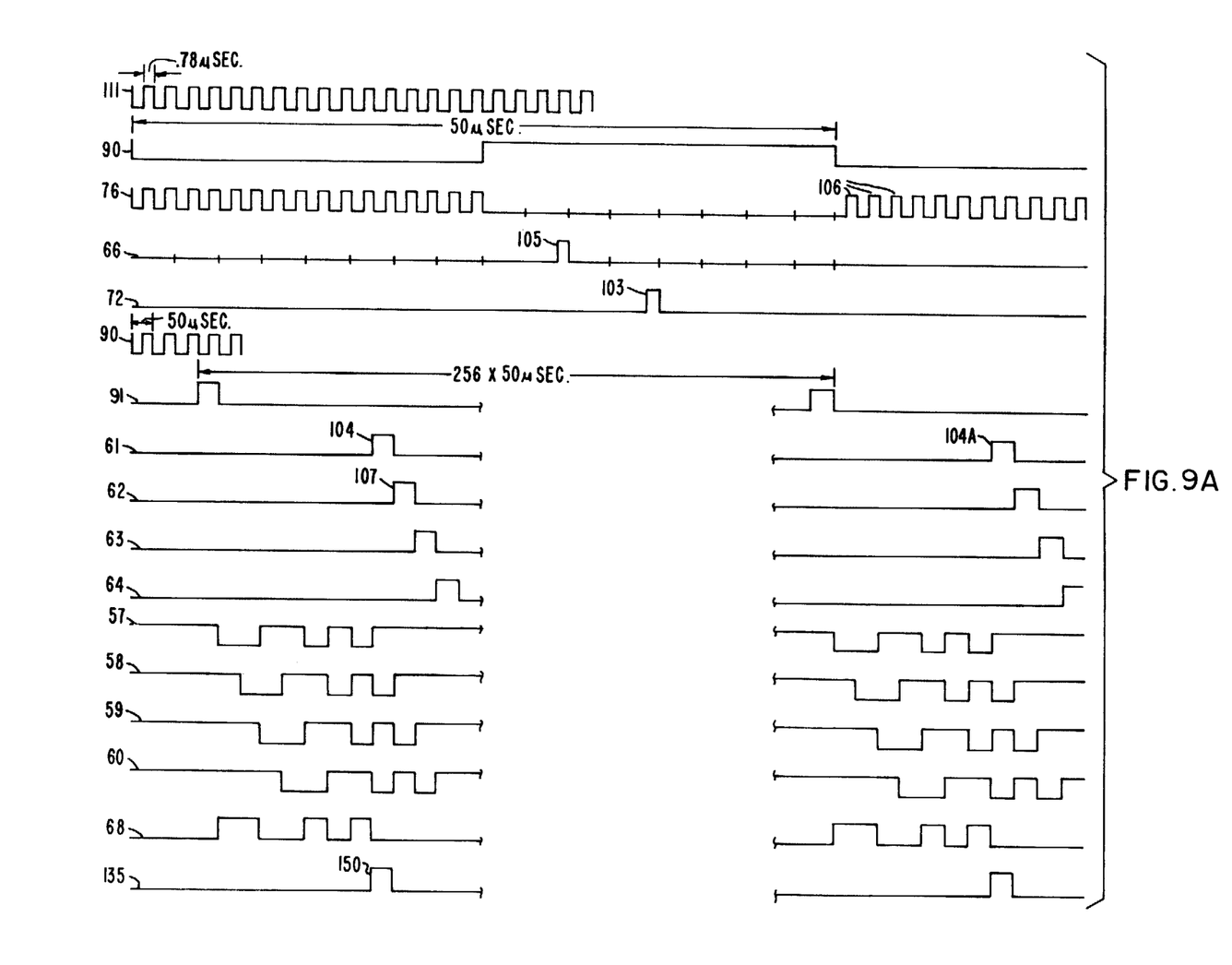
FIGS. 9A and 9B are timing diagrams to illustrate the operation of the control panel system.
Figure 9B:
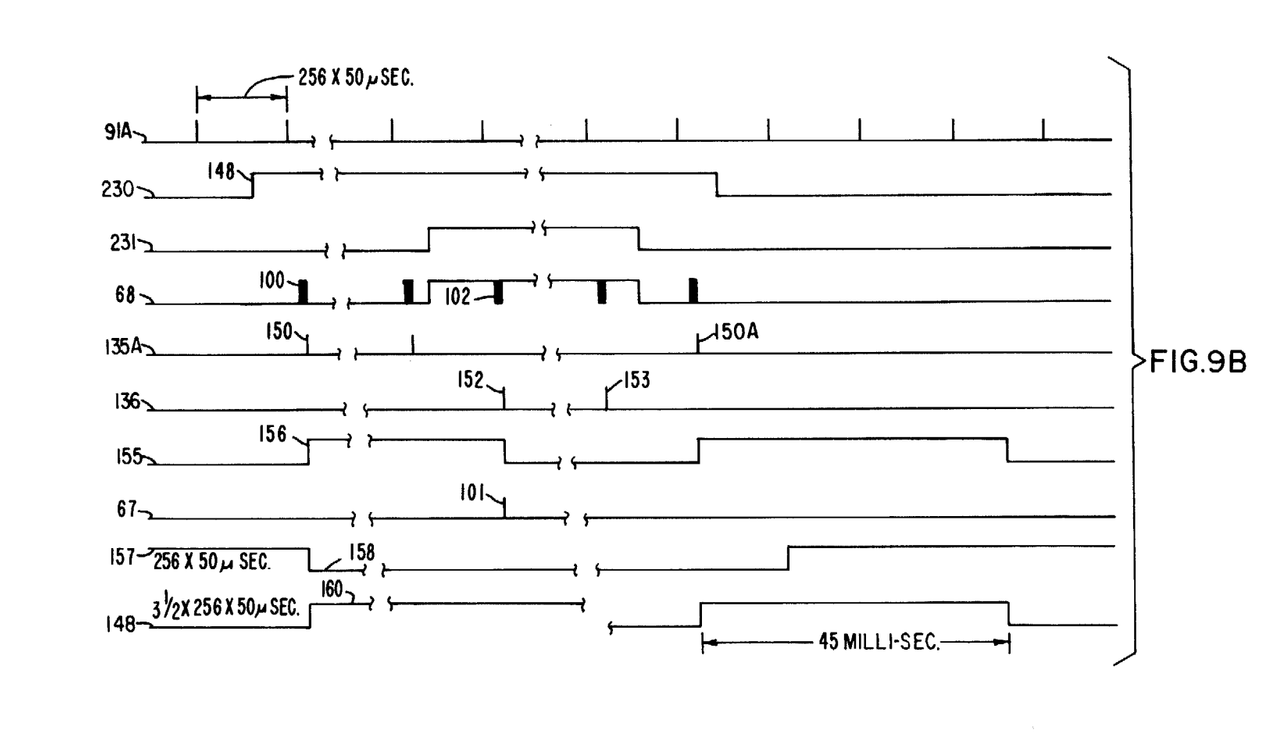

A more detailed description of the organization and operation of the system described in FIG. 4 will be given in connection with a description of its operation for typical changes of control states in connection with the timing diagrams of FIGS. 9A and 9B, the individual waveforms of which bear similar reference numerals as the lines on which they occur in FIG. 4.

When the probe 11 is not being used to visual-red probe display diode 29 is extinguished and the phototransistor 19 is deenergized. Assuming the Register B of control group 25 has been selected, the associated visual-red indicator is illuminated at Register B; but the indicators associated with Register A, Register C, and Register D are extinguished. The control group 26 displays a visual-red illuminated numeral at the numeric display 32; indicating the switching state of Register B. The control group 27 is illuminated at either visual-red indicator 34 or 35, labeled "FAST" or "SLOW," respectively, depending on the switched state of group 27. Control group 28 does not have any visible display. The infrared illumination is continuously being emitted from the target circles 30, 31, 33 and 36 but is invisible to the human eye. The graphics 17, visible to the operator, identifies and locates the several control groups and their respective visual-red illuminated switching state indicators and infrared illuminated target circles. Other than graphics 17 and the illuminated display indicators, no other system elements are visible to the operator viewing the window 20. Coded pulses to the shift register 54 are output according to lines 57, 58, 59 and 60 of the timing diagram of FIG. 9 to energize the respective infrared diodes 15A, B, C, and D, respectively. It is noted that the same code is output for all of the diodes 15, except that each one is delayed slightly in time. The probe 11 is not being used at this time and photo-transistor 19 is not energized. The switching state of none of the control groups can change since there are no output pulses from the escapement circuit 65 on line 67. There are synchronizing pulse inputs as shown on lines 61, 62, 63, and 64 of FIG. 9, each of which is delayed from the preceding pulse. Since there is no change of switch state signal, the memory 71 retains the present state data at the bit address associated with the control groups. Any ambient light noise penetrating through the relatively long cylindrical barrel of the probe nose 47 appears as an uncoded signal and may energize the photo-transistor 19; however, the uncoded pulse sequence is prevented by the escapement circuitry 65 from changing the state of any of control groups 25, 26, 27, or 28, and also does not illuminate the indicator light 29 on the probe 11.

Assuming the operator wishes to select Register C, for example, he holds the probe 11 so that its nose 47 is in close proximity to and aligned with the target circle 30 of the control group 25. The target circle 30 as well as the other target circles 31, 33, and 36 are separate from the state display indicators of their respective group so that when the probe nose 47 is over the target circle, it does not cover any display indicators. When the infrared coded illumination from the diode 15A, aligned with the target circle 30, energizes the phototransistor 19, the visual-red probe diode 27 is illuminated indicating to the operator that the control group 25 has been sensed.

This occurs because the probe output conducts the entire sequence code in its received form to the escapement circuit 65 as shown by a compressed pulse 100 which represents a complete code sequence, such as is shown on line 68. The escapement 65 prevents such code from generating an output pulse on line 67 such as shown at 101 of FIG. 9, while the trigger is "off."

When the operator depresses the probe trigger 42 to close the probe switch 51 (see FIG. 3) and while the photo-transistor 19 is energized as described in the foregoing, the sequence on line 68 is inverted as shown by compressed pulse 102 of FIG. 9. This causes the escapement circuit 65 to ouput the single pulse on line 67, through "OR" gate 78 and line 80 to the control groups 25, 26, and 27. This pulse on line 80 does not affect any control group except 25, because such pulse occurs coincidentally with the last bit of the inverted code, which is synchronized with the pulse on line 61 of FIG. 9. It is recalled that the codes and pulses for the other groups are delayed slightly, thus preventing such coincidence between pulse 101 and their respective delayed pulses. Consequently, the switching state of the control group 25 will then change from Register B to Register C.

Figure 7:
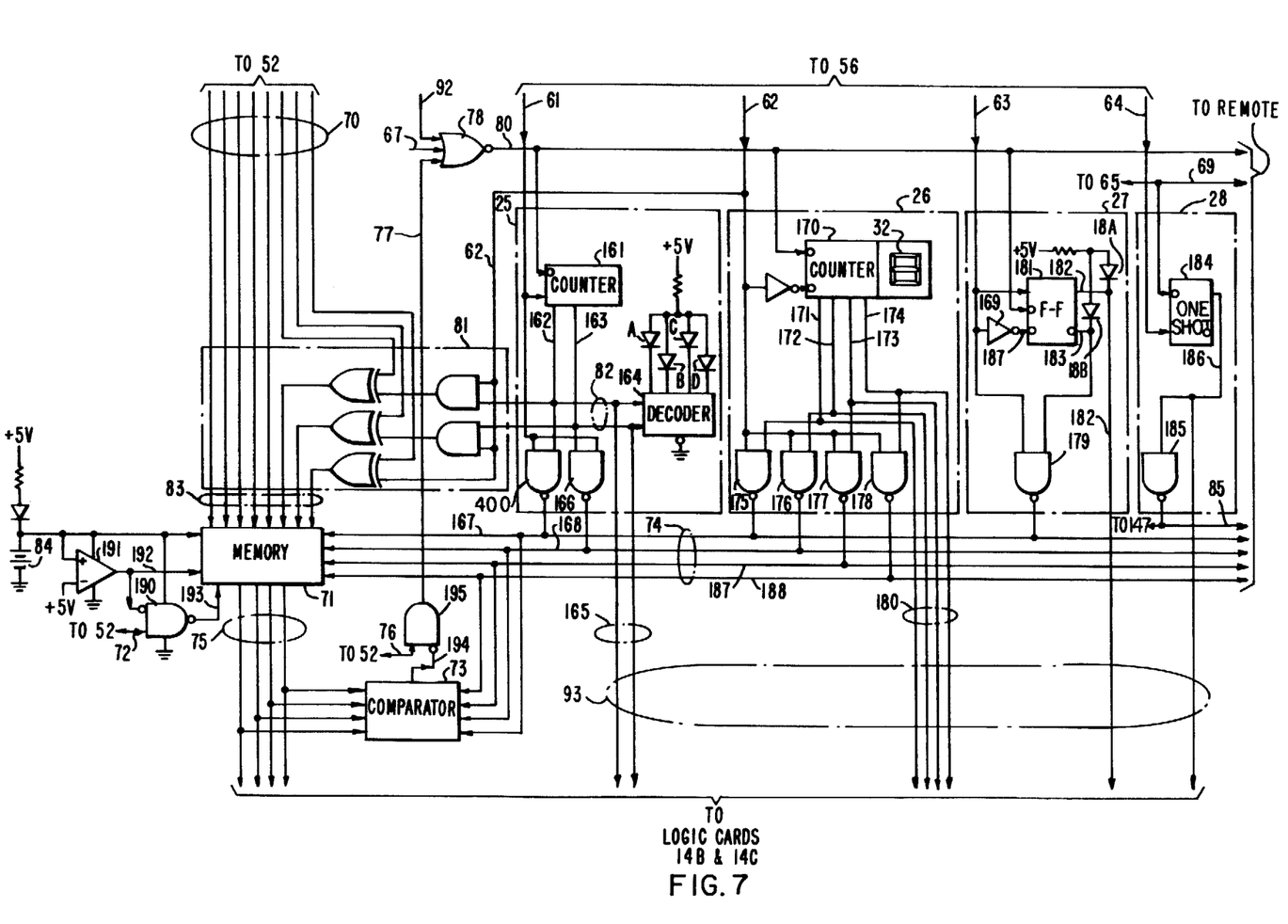
FIG. 7 is a detailed functional schematic diagram of the circuitry of the memory, adder, comparator, and control portion of the system.

More specifically, upon the occurrence of the enable pulse 104, which is 50 microseconds, duration, for example; and upon the occurrence of the escapement pulse 105 which is approximately 0.78 microseconds for example, a counter to be described in FIG. 7 is incremented one step to extinguish the Register B diode and illuminate Register C. Such escapement is synchronized to occur upon the termination of pulse 105 on line 66. The pulse 105 occurs during the first portion of the last half of the enable pulse 104. During such last half memory write pulse 103 occurs on line 72, which permits an output on line 74 to change the state of the data stored at the associated memory address for control group 25.

Upon the occurrence of the next enable pulse 104A during the next scan, a series of auto-clock pulses 106 occur on the line 76 to the comparator 73. These pulses are each of approximately 0.78 microsceonds so that there are 16 pulses during the first half of each enable pulse 104 and 104A, etc. During each one of the pulses 106, the output on line 74 is compared with the state of the memory 71 on line 75, if there is agreement nothing further occurs. If there is disagreement, during the occurrence of any one of the 16 pulses 106, an output pulse occurs on line 77 to the "OR" gate 78 to increment the counter in control group 25. Thus, during each enable pulse, the actual state is compared with the stored state of the device in the memory 71 at least 16 times according to the present embodiment of the invention. Thus, if for any reason the control group state does not agree with the memory state, at such address time, the switch is forced to change until agreement between the actual switch state and the memory state occurs. Since the memory 71 is non-volatile, after the resumption of a power loss, for example, the system is restored to its state previous to such malfunction.

Upon the change of state of group 25 from Register B to Register C, the numerals displayed at 32 of group 26 change to the previously stored state of Register C. At the same time the state input of group 25 connected to the adder 81 is changed, so that upon the occurrence of pulse 107, the address in the memory is changed to correspond to the Register C. Thus, upon the occurrence of the enable pulse 107 on line 62, there may be a disagreement between a counter (see FIG. 7) for the display state 32 of group 26 and the stored memory data for such memory selected address. In such event, during the first half of such enable pulse 107 for group 26, a change in the state of the counter of group 26 sequentially occurs until there is agreement.

This possible disagreement is sensed 16 times as previously mentioned during the first half of each pulse 107; thus if the display counter 32 is displaying a numeral 2 for example prior to the change of Register B to Register C of group 25, the display state can be sequentially changed in ascending order to display the numeral 1 during the 25 microsecond period with up to 16 possible display states. Thus, such change appears to the human eye as being instantaneous. Also, it is apparent from the preceding description that upon a change in registers of group 25, the previously described memory and comparator circuit arrangement also forces agreement of the numeric display 32 with the state of the newly selected register of group 25.

Assuming that the operator desires to change the state of control group 27, he aligns the probe with target circle 33, and operates the trigger as previously mentioned. The circuit operates in the same manner, except that the sequence code and synchronizing pulses are slightly delayed in time to affect only group 27.

Assuming that the switch of control group 28 is desired to be turned "on," the probe 11 is aligned with target circle 36 and the probe display diode 29 is illuminated, as previously described. Upon the occurrence of an output on line 69 which occurs at 78 Hz concomitant with the 78 Hz delayed pulses on line 64, which occurs when the trigger is operated to its "on" condition, an output occurs on line 85, through "OR" gate 87 and line 86, which effectively increases the current to the probe display diode 29 to inform the operator that the switch is "on." Upon release of the trigger of the probe, the output on line 69 ceases to turn control group 28 "on". Thus, for group 28 no memory or address is needed. The memory data on line 75 can be used for remote control of other control panel systems and for parallel operations between two or more systems. The change of state data electrically conducted by line 92 from a remote site can be used to control the switching states of the control groups 25, 26, and 27, respectively, provided the change-of-state data is synchronized with the timing pulses into the shift register 118.

Figure 5:
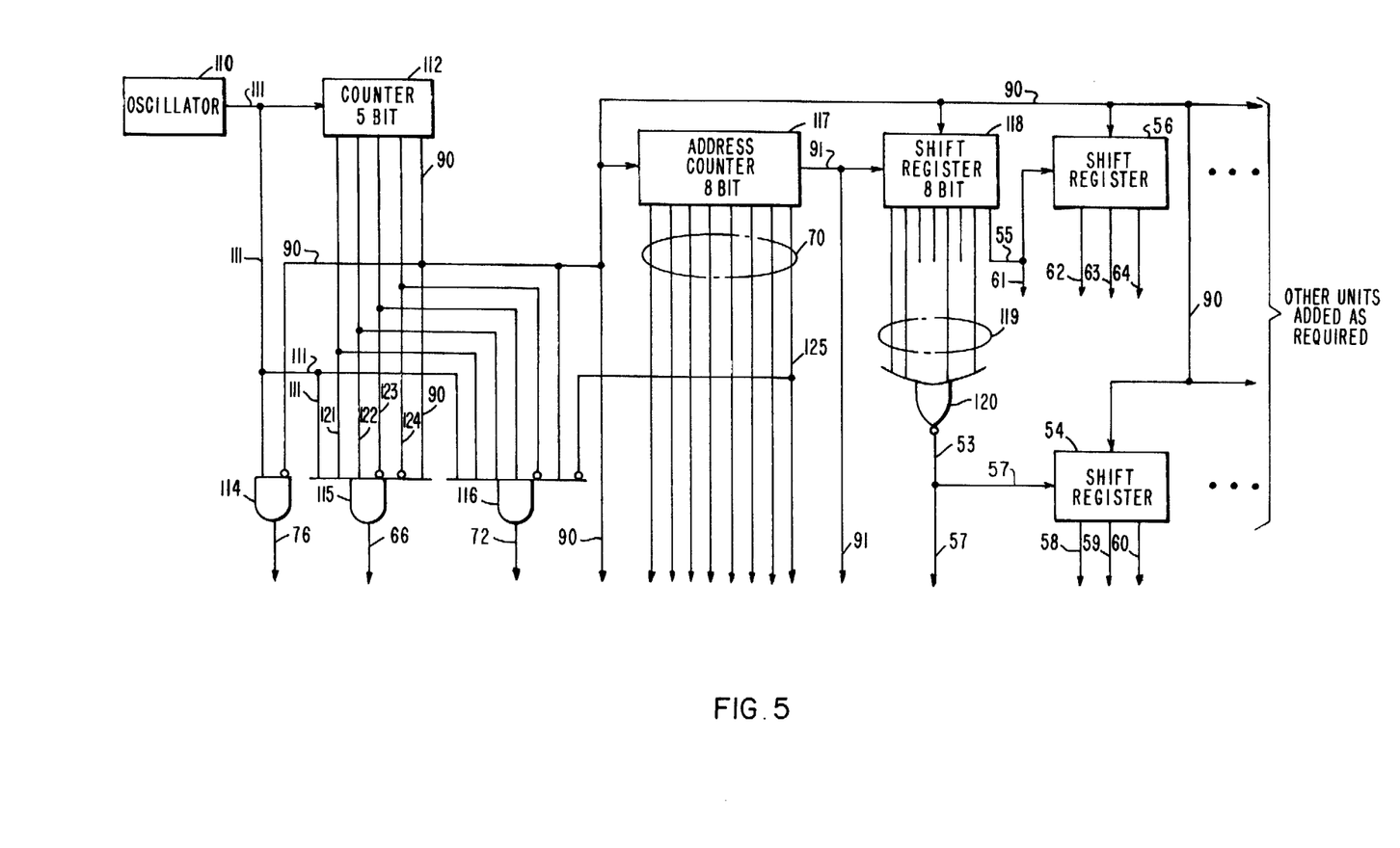
FIG. 5 is a schematic diagram of the timing logic circuitry and shift register.

Reference to FIG. 5, shows the timing and encoding circuitry 52 of FIG. 4 in more detail, the receive shift register 56 and the transmit shift register 54. A conventional oscillator 110 produces a continuous clock frequency of 640 KHz at line 111 shown in FIG. 9 as waveform 111. The pulse signal from oscillator 110 is electrically conducted by line 111 to a conventional 5-bit counter 112, to an AND logic gate 114, to an AND logic gate 115, and to an AND logic gate 116. The clock frequency of 640 KHz is divided by 32 in the 5-bit counter 112 to obtain a bit clock frequency of 20 KHz having a waveform of one pulse cycle for the time span of 50μsec. at line 90, shown in FIG. 9 as waveform 90. A bit clock pulse signal at line 90 is electrically conducted to the AND logic gate 114 and inverted, to the AND logic gate 115, the AND logic gate 116 to the escapement 65 (see FIG. 4), to a conventional 8-bit address counter 117, to a shift register 118, to the receive shift register 56, and to the transmit shift register 54. The bit clock pulse frequency of 20 KHz is divided by 256 in the 8-bit address counter 117 to obtain a sync pulse frequency of 78 Hz at line 91, having one pulse over the time span of 256 × 50μsec. The sync pulse signal, electrically conducted by line 91 is available for use to synchronize the pulse signals from a remote control system, and to the 8-bit shift register 118 where the outputs include a single pulse conducted by lines 55 and 61 to the control group 25 (see FIG. 4), and a series of successively delayed pulses electrically conducted by line 119 to an encoder NOR gate 120. The NOR gate 120 output of encoded pulses are electrically conducted by lines 53 and 57 to control diode 15A and by line 57 to the shift register 54. The successively delayed encoded pulse output of the shift register 54, which are delayed with respect to the encoded pulse at line 57 as hereinbefore described, are electrically conducted by lines 58, 59, and 60 to the respective control diodes 15B, 15C, and 15D. The waveforms at lines 57, 58, 59, and 60 are shown in FIG. 9 as 57, 58, 59, and 60, respectively. The single pulse output at the last bit of the shift register 118 is conducted by line 55 to the receive shift register 56. The successively delayed pulses at the output of shift register 56, which are delayed with respect to the pulse at line 61 as hereinbefore described, are electrically conducted by lines 62, 63, and 64 to the control groups 26, 27, and 28 respectively (see FIG. 4). The waveforms at lines 61, 62, 63, and 64 are shown in FIG. 9 as 61, 62, 63, and 64 respectively.

The simultaneous input of the oscillator pulses by line 111 and the inverted bit clock pulses by line 90 to the AND logic gate 114 generate a pulse sequence at the output of the AND logic gate 114 and electrically conducted by line 76 (see FIG. 9, waveform 76) to the comparator 73 (see FIG. 4). The simultaneous input of the oscillator pulses by line 111, and the successive pulses by lines 111, 121, 122, 123, 124, and 90, where the pulses by lines 123 and 124 are inverted, to the AND logic gate 115 permit a pulse to be at the output of the AND logic gate 115 and electrically conducted by line 66 to the escapement circuit 65 (see FIG. 4). The pulse output at line 65 is shown as 66 in FIG. 9.

The sinultaneous input of the oscillator pulses by line 111, the successive pulses from the counter 112 by lines 121, 122, 123, 124, and 90, and the inverted pulse from the address counter 117 by line 125 to the AND logic gate 116 permit a pulse to be at the output of the AND logic gate 116 that is electrically conducted by line 72 to the memory 71 (see FIG. 4). The waveform of the pulse output at line 72 is shown as 72 in FIG. 9.

The bit address output of the address counter 117 is electrically conducted by lines 70 to the adder 81 (see FIG. 4).

Figure 6:
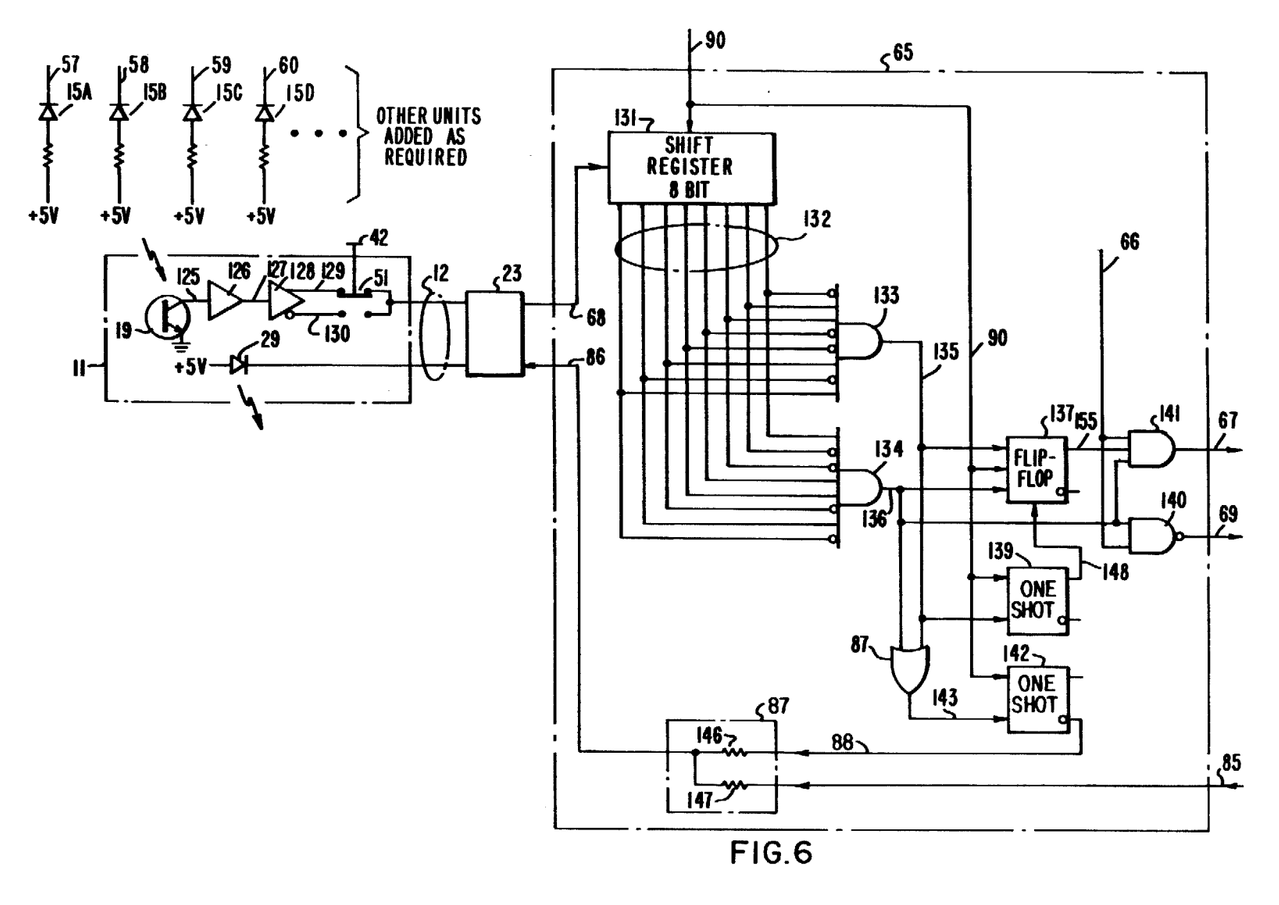
FIG. 6 is a schematic diagram of the escapement and probe circuitry of the system.

Referring to FIG. 6, which shows the logic circuitry of the escapement circuit 65 in FIG. 4 and the functional schematic of the probe 11 in more detail. The coded infrared light pulses from the selected control diode 15A, B, C, or D on lines 57, 58, 59 or 60, respectively, enter the photo-transistor sensor 19 in the probe 11 where the infrared light pulses are converted to electrical pulses. The coded electrical output is conducted by line 125 to amplifier 126 for amplification. The amplified coded pulses are conducted by line 127 to a threshold circuit 128 which converts the coded pulse output, which is in an analog form, of the amplifier 126 into a digital form. Threshold circuit 128 has two output lines where a normal pulse output is at line 129 and an inverted pulse output is at line 130. When the trigger 42 is not depressed ("trigger-OFF" state), the probe switch 51 is in contact with the normal coded pulse signal at line 129; when the trigger 42 is depressed ("trigger-ON" state), the probe switch 51 is in contact with the inverted coded pulse signal at line 130. Depending on whether the trigger 42 is depressed or not, the signal on either line 129 or 130 is conducted by line 68 in the connecting cord 12 through connector 23 (see FIG. 1) to the escapement circuit 65. The coded signal on line 68 and the clock pulses on line 90 are inputs to an 8-bit shift register 131. The successively shifted pulses from shift register 131 are conducted by lines 132 to AND logic gates 133 and 134. However, the pulse signals on said input lines to the AND logic gate 134 are inverted from the pulse signals on the said input lines to the AND logic gate 133. The output of the decode AND logic gates 133 and 134 is a 50μsec. pulse on lines 135 and 136, respectively. The pulse output of the AND logic gate 133 is conducted to flip-flop 137, to the OR gate 87, and to a retriggerable "ENABLE" one-shot 139. The pulse output of the AND logic gate 134 is conducted to the flip-flop 137, to the OR logic gate 87, and to a NAND logic gate 140 to an AND logic gate 141. Pulses from the timing logic circuitry (see FIG. 5) are conducted by line 90 to the flip-flop 137, to the "ENABLE" one-shot 139 to a retriggerable feedback one-shot 142. Pulses from the timing logic circuitry (see FIG. 5) are conducted by line 66 to the AND logic gate 141 and to the NAND logic gate 140.

A pulse conducted by either line 136 or line 135 to the OR gate 87 produces a pulse conducted by line 143 to the one-shot 142. The output of the one-shot 142 is a pulse at logic level "ZERO" conducted by line 88 to an "OR" function within the dashed lines referred to at 87; the "ZERO" level applied to a resistor 146 is conducted by line 86 through connector 23, by cord 12 to energize the visual-red diode 29 in probe 11. An additional "ZERO" level applied at control feedback line 85 (see FIG. 4) to a resistor 147 of the "OR" function within the dashed lines referred to at 87, will cause the intensity of the illumination of the visual-red probe light 29 to increase.

The occurrence of pulses at the "trigger-OFF" decode line 135 in coincidence with the timing pulses at line 90 will enable the one-shot 139 and an "ENABLE" signal will be conducted by line 148 to enable the flip-flop 137. If the pulses at the "trigger-OFF" line 135 terminate, the "ENABLE" signal from the one-shot 139 will cease 45 milliseconds after the last "trigger-OFF" pulse. The coincidence of the "trigger-OFF" decode pulses at line 135 and the timing pulses at line 90, set the flip-flop 137. The flip-flop 137 will remain set until reset by either a "trigger-ON" decode pulse or the return of ENABLE one-shot 139 to its logic "ZERO" level.

The occurrence of a pulse at the "trigger-ON" decode line 136 while the flip-flop 137 is at a logic ONE d.c. level, will cause on pulse to escape via the AND logic gate 141 onto line 67 during the timing pulse on line 66. No additional pulses will escape to line 67 while the probe switch 51 is in the "trigger-ON" position because the flip-flop 137 is reset by the first "trigger-ON" decode that is detected within the time limit of ENABLE one-shot 139.

The coincidence of the timing pulses at line 66 and the "trigger-ON" decode pulse at line 136 will cause the NAND logic gate 140 to conduct pulses at the "trigger-ON" line to control group 28 (see FIG. 4) while the probe switch 51 is in the "trigger-ON" position.

Referring againt to FIG. 9, escapement circuit waveforms are shown at a time when the photo-transistor 19 is sensing control diode 15A at line 57. Waveform 68 at the probe switch 51 output line 68 is in phase with waveform 57 but of opposite polarity while the probe switch 51 is in the "trigger-OFF" position. Waveform 135, at the "trigger-OFF" decode line connected to the output of the AND logic gate 133, shows a positive pulse 150 in coincidence with the receive pulse 104 in waveform 61 and occurs while the probe switch 51 is in the "trigger-OFF" position. No pulses escape from the escapement circuit while the probe switch 51 is in the "trigger-OFF" position, as hereinbefore described. Waveform 91A is in the sync pulse at line 91 (see FIG. 5) shown in a compressed scale relative to the sync pulse waveform 91 since the succeeding waveforms in FIG. 9 are also shown in said compressed scale in view of the extended time period for the operation of the system relative to the timing pulse periods.

Waveform 230 shows the time period during which the probe is placed "ON target" by the operator and is sensing the selected infrared diode 15. Waveform 231 shows the time period during which the probe trigger is depressed by the operator.

Waveform 68 at the probe switch 51 output line 68 shows a positive coded pulse 100, in compressed-time scale, while the probe is "ON target" but the probe trigger 42 is in the "trigger OFF" state. A negative coded pulse 102, in compressed-time scale, occurs at line 68 when the probe trigger 42 is in the "trigger ON" state while the probe is "On target."

Waveform 135A at the "trigger OFF" decode 135 shows a pulse 150 which is in phase with the pulse signal on receive line 61, however, the pulse 150 will be prevented from escaping to the input pulse line 67 by the flip-flop 137. Waveform 136 at the "trigger ON" decode line 136 shows a pulse 152 which escapes to the input pulse line 67 and is in coincidence with the receive pulse at line 61 to change the state of control group 25; however, succeeding pulses, such as the pulse at 153, will not escape as hereinbefore described.

Waveform 155 at the output line 155 of flip-flop 137 shows a pulse 156 which is positive after the flip-flop 137 is set by one "trigger OFF" decode pulse 150 and is zero after the first "trigger ON" decode pulse 152. It remains zero until after the probe 11 is in the "trigger OFF" state and the first "trigger OFF" decode pulse 150A sets it as hereinbefore described. Only the first pulse 152 will escape to the input line 67 as hereinbefore described.

Waveform 67 at the input line 67 shows pulse 101 in time phase with the first "trigger ON" decode pulse 152. Pulse 101 is in coincidence with the receive pulse on line 61 to change the state of control group 25 as hereinbefore described.

Waveform 88 at the output line 144 of the retriggerable feedback one-slot 142 shows a negative pulse 158 which becomes negative when the first "trigger OFF" decode pulse 150 appears at line 143 following the sensing of an infrared control diode 15 by photo-transistor 19 and remains negative until the probe 11 is oriented so that the phototransistor 19 can no longer sense the coded infrared pulses from a selected diode 15. Consequently, at that time, the pulse input at line 143 will terminate and the output of the one-shot 142 also terminates 12.8 milliseconds later.

Waveform 148 at the output line 148 of the retriggerable "ENABLE" one-shot 139 shows a positive pulse 160 which becomes positive while "ENABLE" one-shot 139 is in the "set" state in response to the occurrence of pulses at the "trigger OFF" decode line 135 and the timing pulses at line 90. The pulse 160 will become a "zero" approximately 45 milliseconds after the last "trigger-OFF" pulse on line 135 as hereinbefore described.

As hereinbefore described, the signals from the probe switch 51 are pulse sequence coded and are conducted to the escapement circuitry by a single conductor 68. Because of the coding, the escapement circuitry can reject input signals due to extraneous light noise and accept only correctly coded signal inputs from the selected switch. The data is also pulse time coded so that the signal output pulse escaping on line 67 from the escapement circuitry will occur in time coincident with the receive time pulse for the selected control group; the switching state of the selected control group changes in response to the time coincidence of the two said pulses. Furthermore, the input data is polarity coded so that the escapement circuitry can determine the state of the probe trigger and allow only a single output pulse to escape to the selected control group each time the probe is triggered.

Referring to FIG. 7, which shows the functional schematic circuitry of the memory, adder, comparator, and control group switching logic, the control group within the dashed lines referred to as 25 employs a binary counter 161 as its basic switching element which will increment only when the receive pulse on line 61 is in coincidence with the inverted pulse on line 80, as hereinbefore described. The control group state data is conducted by lines 162 and 163 to decoder 164 which converts the two-line state input on lines 162 and 163 to a four-line state output that will energize only one of the visual-red display diodes A, B, C, or D depending on the switching state of the control group. The switch state data is conducted by lines 165 to the logic cards 14B and 14C. The state data is conducted by line 162 to a NAND logic gate 400 and by line 163 to a NAND logic gate 166. The receive pulse is conducted by line 61 to the NAND logic gate 400 and to the NAND logic gate 166. The NAND logic gate 400 produces an inverted output pulse at line 67 in response to the coincidence of the receive pulse at line 61 and the switching state at line 162 and said pulse is conducted by line 167 to the memory 71. The NAND logic gate 166 produces an inverted output pulse at line 168 in response to the coincidence of the receive pulse at line 61 and the switching state pulse at line 163; and said pulse is conducted by line 168 to the memory 71.

The control group 26 employs a counter 170 as its basic switching element which will increment only when the pulse at line 80 is in coincidence with the receive pulse at line 62. The illuminated display diodes 18 from a numerical display 32 in accordance with the selected switching state of counter 170. The state data output of counter 170 are conducted by lines 171, 172, 173 and 174 to NAND logic gates 175, 176, 177, and 178 respectively. The receive pulse is conducted by line 62 to the NAND logic gate 175, to NAND logic gate 176, to NAND logic gate 177, and to NAND logic gate 178. Switching data output of NAND logic gate 175 are conducted by line 167 to memory 71 in response to the coincidence of the receive pulse at line 62 and the state data at line 171. Likewise, switching data output of NAND logic gate 176 is conducted by line 168 to the memory 71 in response to the coincidence of the receive pulse at line 62 and the state data at line 172; switching data output of the NAND logic gate 177 are conducted by line 187 to the memory 71 in response to the coincidence of the receive pulse at line 62 and the state data at line 173; and switching data output of the NAND logic gate 178 are conducted by line 188 to the memory 71 in response to the coincidence of the receive pulse at line 62 and the state data at line 174. State data are conducted by lines 180 to the logic cards 14B and 14C (FIG. 1).

The control group 27 employs a flip-flop 181 as the basic switching element which will toggle only when the pulse at line 80 is in coincidence with the receive pulse at line 63 as hereinbefore described, after the receive pulse is conducted via inverter 169 to the flip-flop 181. Pulse inputs on lines 80 and 187 are inverted by the flip-flop 181. Only one of the two display diodes 18A or 18B, which are energized by line 182 and 183 respectively, is illuminated at a time to indicate the state of the control group. The line 183 conducts the state data from flip-flop 181 to a NAND logic gate 179 and line 63 conducts the receive pulse to the NAND logic gate 179. Switching data output of the NAND logic gate 179 are conducted by line 167 to the memory 71 in response to the coincidence of the receive pulse at line 63 and the state data at line 183. State data is conducted by line 182 to the logic cards 14B and 14C.

The control group 28 employs a retriggerable one-shot 184 as a switching element which will be triggered only when the pulse at line 69 is in coincidence with the receive pulse at line 64 as hereinbefore described. The one-shot 184 inverts the input at line 69. The state of the one-shot 184 is conducted by line 186 to a NAND logic gate 185. The output state of the NAND logic gate 185 at line 85, responsive to the state data at line 186, is conducted by the feedback line 85 to the probe feedback light 29. When the state of the one-shot 184 is "ENABLE," the intensity of the probe light 29 will increase as hereinbefore described.

Bit addresses are conducted by lines 70 to adder 81, then via lines 83 to the memory 71. The switching state data conducted to memory 71 by lines 74, are stored at the respective bit addresses within the memory 71. The write clock pulses are conducted by line 72 from the timing logic circuit 52 (see FIG. 5) to the NAND logic gate 190. The analog comparator 191 senses the relative voltage between the +5 volt logic power supply (not shown) and the 4 volt battery 84. The output signal of the comparator 191 is conducted by line 192 to the NAND logic gate 190 and to the memory 71 chip enable. Loss of the +5 volt logic voltage will cause a high logic level at line 192 to inhibit the memory chip select and to inhibit the write clock output on line 193 and prevent new state data from being stored in memory 71.

The digital comparator 73 compares the memory data inputs at lines 75 and state data inputs at lines 74. There is normally a high logic level at line 194 if the switch data is equal to the memory data. Timing pulses are conducted by line 76 from the timing circuit 52 (see FIG. 5) to the input of the AND logic gate 195. Coincidence of the timing pulses at line 76 and the data not equal signal at line 194 at the input of the AND logic gate 195 causes the associated control group to automatically change state in response to the output of AND logic gate 195 on line 77 as hereinbefore described. The automatic control operation functions to correct the present switching state of a control group, in the event the present switching state is not the desired state because of, for example, a loss of power, by clocking the input line during the receive time until the desired switching state is reached as hereinbefore described. Furthermore, the automatic control operation is utilized in a switching arrangement, such as in this embodiment, where the switching state of control group 26 is automatically changed in response to a change in the switching state of control group 25, to indicate the correct present state for the control group 25 as actuated. In addition, the automatic operation is also utilized for remote sensing and remote control of the control panel system since all control group switching data states are available in serial form at the memory data output of memory 71 for transmittal to a remote site for display in a similar control panel; a time coded control input from the remote site is received by a single remote input line 92 as a change of state pulse by the "OR" gate 78 and input line 80.

The adder 81 is employed to modify the memory address during the receive pulse, conducted by line 62. The switching state data conducted by lines 162 and 163 to the adder 81 in coincidence with the receive pulse at line 62, causes an offset in the memory address that is dependent upon the state of the counter 161.

The normally generated change pulse is conducted by line 67 and the remote input pulse is conducted by line 92 respectively to the NOR logic gate 78 as hereinbefore described (FIG. 5). The automatic change pulse is generated on line 77.

Figure 8:
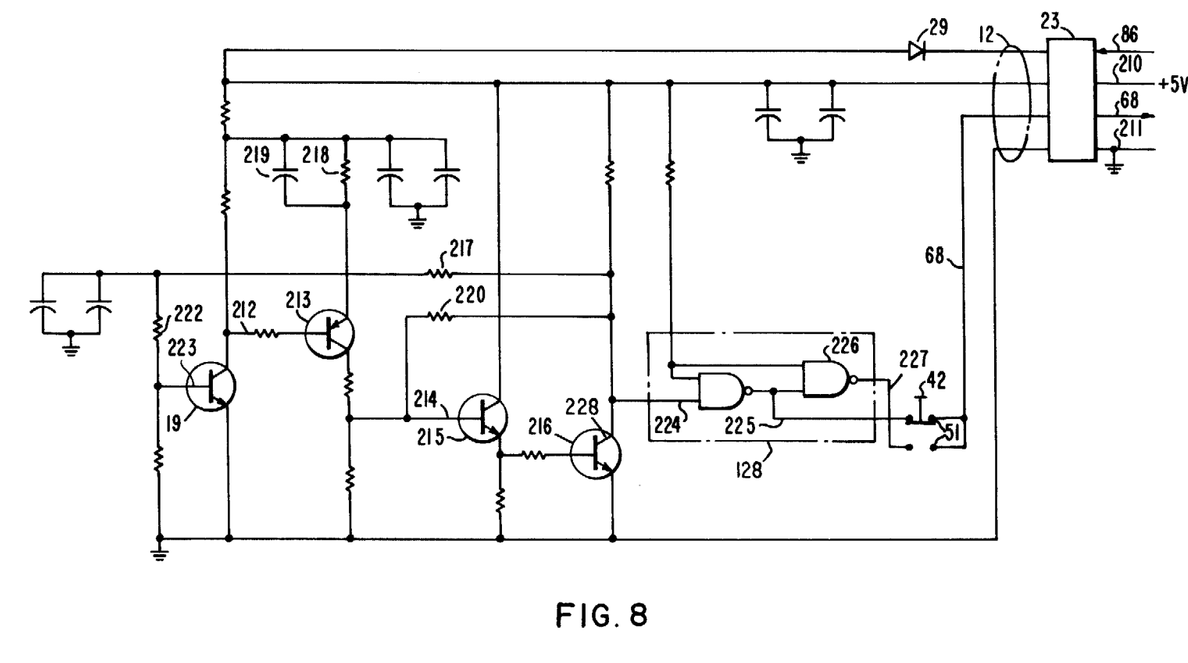
FIG. 8 is a more detailed schematic diagram of the probe circuitry.

Referring to FIG. 8, which shows a schematic of the circuitry within the probe 11 connected by the cord 12 to the connector 23 which is attached to the control panel 21 (see FIG. 1). Cord 12 is comprised of line 86 by which the feedback signal is conducted to the visual-red probe light 29, line 68 by which the coded pulses are conducted to the 8-bit shift register 131 (see FIG. 6), and lines 210 and 211 which conduct the +5 volts and ground connection from the power supply (not shown) respectively. The phototransistor 19 converts coded infrared pulses into coded electrical pulses. The phototransistor 19 is more sensitive to and is matched more closely to the narrow beam infrared illumination from control diode 15 (see FIG. 1) than it would be if a wide-angle beam visual-red diode were used as the control diode; a better match is obtained without the need for high current drivers for the control diodes to achieve an equivalent output. The photo-transistor amplifier 126 (see FIG. 6) is biased to "OFF" and has a very short recovery time from strong "ON" input pulses. The electric pulses are conducted by line 212 to an inverter 213 which inverts and amplifies the input signal conducted by line 214 to an emitter-follower 215 and inverter 216 which further amplify the coded electrical pulses. Feedback through the resistor 217, which tends to cause slow recovery from very strong coded infrared pulses as received from the control diodes (see FIG. 6) at close range, is compensated for by negative feedback by the resistor 218 and the capacitor 219 connected in parallel combination which provide fast recovery time for the inverter 213. Negative feedback as provided from the collector 228 of the inverter 216 and resistor 220 to base 214 of the emitter-follower 215 maintains a constant gain and provides stability independent of transistor gain. Negative feedback provided from the collector 228 of the inverter 216, resistor 217 and resistor 222 to the base 223 of the photo-transistor 19 maintains the output voltage at the line 224 just above the internal threshold voltage of the threshold circuit within the dashed lines referred to at 128 for normal ambient light conditions. However, when the phototransistor 19 senses the coded infrared pulses at the selected diode 15A, 15B, 15C or 15D (see FIG. 4), the converted coded electrical pulses are amplified to cross the said threshold. The normal coded pulses are conducted by line 225 to the probe switch 51 shown in the "trigger-OFF" position. The normal coded pulse output is conducted to the NAND gate 226 where the coded pulses are inverted and conducted by line 227 to the probe trigger switch 51 and connected to the "trigger-ON" position of the switch 51. Consequently, the pulses at line 227 are inverted with respect to the pulses at line 225.

The probe 11 is self contained so that connector 23 can be disconnected from the control panel assembly 10 (see FIG. 1) with no change resulting in the switching state of any of the control groups.

The operation of the visual-red probe light 29 is as hereinbefore described. Three functions provided by probe light 29 are (1) to verify to the operator that the control diode infrared emission is being sensed, (2) to verify that the timing and logic circuitry associated with the coded pulses is operating satisfactorily; and (3) to provide an illuminated display for the momentary pushbutton type of control groups, such as control groups 28, while the probe is in position at that control group.

The probe 11 operates on the same +5 volt power supply as the control panel assembly 10, thus a separate power supply is not needed.

As hereinbefore described, the probe 11 mechanism provides the operator with the option of either using the probe as a pointer with switching action initiate by pushing the nose 47 against the clear window 20 (see FIG. 1) at the selected switching location, or the probe can be used as a gun with switching action initiated by squeezing the probe trigger 49 while being properly aimed at the selected switch location. Movement of the inner assembly 41 relative to the sleeve 40 increments the switching state of the control group to which probe 11 is optically coupled (see FIG. 3).

The control panel system hereinbefore described in a preferred embodiment may employ variations in details without departing from the spirit and scope of the invention, for example:

The control group 25 (see FIG. 4) can be designed to be rotatable in either direction. An up-down counter or a left-right shift register could be employed in the logic circuitry design. One target circle and an associated control diode would be employed to control the rotation in one direction and another target circle and an associated control diode would be employed to control the rotation in the opposite direction. The second control diode would use an additional memory address state; however, only one of the two addresses used to control the switch would be used for data transfer between the non-volatile memory and the control switch. Also, an additional one-shot could be added to the panel control logic to inhibit data transfers from memory to the control switches for one full address counter scan after every manual input timing pulse to allow proper storage of new switch data in the non-volatile memory. A separate control diode and target circle for each of the states could be added to the control group 25. The operator could then select the desired state directly in a single step rather than by one-step increments. To implement this addition, the switch logic would use a bit counter that is loaded to the desired state by each of the manual input timing pulses. Slaving of the bit counter to the non-volatile memory would occur during only one of the receive times associated with that control group and would be delayed for one scan after an above-described timing pulse input.

A memory output data bus rather than a memory input data bus could be used for communication between the switch logic and the non-volatile memory. To implement this change, slaving of the switch registers to the non-volatile memory would take place by direct transfer of the memory data to the control group registers. The manual and remote control of switch states stored in the non-volatile memory would be accomplished by using a read-only memory or programmable logic array to determine the next state of the control group as a function of the control group type, the present state of the control group and the selected control diode address.

We claim:
1. A control panel system, comprising
   a panel having a plurality of spaced locations, each location being designated for the switching of respective apparatus to a selected state;

a light-emitting means for each of the switching locations of the panel;

switching means operable from one predetermined state to another predetermined state associated with each of the light-emitting means;

a manually manipulable probe having a light-sensitive means attached thereto for placing the light-sensitive means in optical relationship with a selected one of the light-emitting means;

a trigger means operable manually to a first and second condition;

first circuit means coupled to each light-emitting means operative to cause each light-emitting means to emit repetitively a first distinct code, the emission of each first distinct code for each location being different than the emitted first code for another location;

second circuit means responsive to the optical relationship of the light-sensitive means and any one of the light-emitting means to detect the reception of a respective first code at times when the trigger means is in its first condition;

third circuit means responsive to the reception of each first distinct code by the light-sensitive means and the operation of the trigger means to its second condition to convert a respective first code to a distinct second code representative of the respective received first code; and control circuit means responsive to the detection of the reception of the first distinct code by the second circuit means followed by the reception of its representative second distinct code generated by the third circuit means to operate the switching means associated with the light-emitting means that is emitting said first distinct code.

2. A system according to claim 1, further comprising, indicating means operative when activated to indicate the optical relationship between the light-sensitive means and one of the light-emitting means, and means responsive to the detection of the reception of any one of the first distinct codes to activate said indication means.

3. A system according to claim 1 wherein the first circuit means includes means to generate a distinct series of electrical pulses at a predetermined frequency to constitute the first distinct codes, each said distinct series occurring at different times for each light-emitting means.

4. A control panel system, comprising a panel having a first plurality of spaced locations each location being designated for the switching of respective apparatus to a selected state and indicating such switched state, a light-emitting means for each of the locations, switching means operable from one predetermined state to another predetermined state associated with each of the light-emitting means, a manually manipulable probe having a light-sensitive means attached thereto for placing said light-sensitive means in an optically coupled relationship with a selected one of the light-emitting means, a trigger means operable manually to a distinct condition, first circuit means operatively coupled to each light-emitting means to govern said means to emit light corresponding to a distinct code, a second circuit means operatively coupled to the light-sensitive means to generate output signals corresponding to the distinct code at times when the light-sensitive means and one of the light emitting means are in an optically coupled relationship, normally inactive third circuit means activated distinctly in response to the output signals of the second circuit means followed by the operation of the trigger means to said distinct condition to operate the switching means from one state to another state, non-volatile memory circuit means including the switching means to store the operated state of each switching means in response to the activation of the third circuit means, and a fourth circuit means governed by the stored operated state of the switching means at times when the third circuit means is inactive to operate each switching means to the operated state that is stored in the memory circuit means.

5. A system according to claim 3 wherein said third circuit includes means operative to invert said first distinct code to provide the representative second distinct code.

6. A control panel system, comprising a panel having a plurality of spaced locations, each location being designated for the switching of respective apparatus to a selected state, a light-emitting means associated with each of the locations;

switching means operable from one predetermined state to another predetermined state associated with each of the light-emitting means;

a manually manipulable probe having a light-sensitive means attached thereto;

a trigger means connected to said probe operable manually to a distinct condition;

first circuit means for operating the light-emitting means to emit repetitively a code, each code being a series of distinct electrical pulses occurring at a predetermined frequency, second circuit means including the light-sensitive means operative to generate signals corresponding to each repetitive code at times when the light-sensitive means and a light-emitting means are optically coupled, and third circuit means responsive to at least a single complete code followed by the operation of the trigger means to its distinct condition during the generation of signals corresponding to said codes to change the state of an associated switching means from one state to another.

7. A system according to claim 6 wherein the switching means is normally in one state, and said third circuit means includes means to operate the switching means from another state to its one state in response to the termination of the optical coupling.

8. A control panel system, comprising a plurality of switching means each operable to one of a plurality of predetermined states, a first means for each switching means operative to emit an optical sequence code, each said code constituting a plurality of pulses occurring at a predetermined frequency, each said code being different than another code, a second means for receiving said sequence codes when optically coupled to a respective one of the first means, a normally manipulable probe having a trigger means operable selectively to a first and second condition, a first circuit means mounted in the probe and removably connected electrically to the third circuit means to generate a first distinct output at times when the trigger means is in its first condition and operative to generate a second distinct output at times when the trigger means is in its second condition in response to a respective received sequence code, indicating means responsive to the first distinct output to determine the existence of an optical coupling between the first and second means, and third circuit means when electrically connected to the first circuit means responsive to said first distinct output followed by the second distinct output to generate a third distinct output characteristic of one of the switching means, and means responsive to the third distinct output to change the state of a respective switching means.

9. A control panel system for changing the state of a plurality of individual controls upon the optical coupling of a portable light-sensitive probe and one of a plurality of light-emitting devices, each said light-emitting device being associated with a respective control, said system comprising first circuit means to generate repetitively a code sequence of pulses for each of the light-emitting devices, the generated code sequences for each device being in time-spaced relationship, second circuit means to generate a synchronizing output for each time-spaced sequence between each code sequence, third circuit means governed by the optical coupling of the light-sensitive probe and one of the light-emitting devices to generate a first distinct output in response to the complete reception of one of the time-spaced codes, fourth circuit means operative when activated to vary the received code to generate a second distinct output, and fifth circuit means responsive to the first distinct outputs and at least one synchronizing output followed by the second distinct output to generate a third output to change the state of a corresponding switching means.

10. A system according to claim 9, further comprising non-volatile addressable memory means operative to store the operated state of each switching means in a predetermined address of the memory in reponse to said third output, and sixth circuit means including the memory means for addressing each of said switching means repetitively, seventh circuit means governed by the dissimilarity between the operated state of each switching means and the stored state of the switching means in its respective address in the memory and the absence of the second distinct output from the fourth means to change the state of the switching means to that state stored in the memory.

11. A system according to claim 6 wherein said third circuit means includes escapement circuit means responsive to the signals generated during said code to change the state of the switching means only once for each operation of the trigger means to its distinct condition.

12. A system according to claim 6 wherein the switching means includes a first switching means operable to a plurality of sequential states and a plurality of second switching means each operable to a plurality of sequential states;

a first single light-emitting means being associated with the first switching means and a second single light-emitting means being associated with the second switching means; and wherein said third circuit means includes first means to change the state of the first switching means in a predetermined sequence in response to each operation of the trigger means to its distinct condition at times during the generation of signals by the second circuit means corresponding to the code of said first single associated light-emitting means, each said state corresponding to a selected one of the plurality of second switching means, and said third circuit means includes second means to change in sequence the state of each selected second switching means in response to each operation of the trigger means to its distinct condition at times during the generating of signals by the second circuit means corresponding to the code of said second single associated light-emitting means.

13. A system according to claim 6 wherein the probe comprises a hollow handle portion, and said second circuit means is mounted in said hollow handle portion.

* * * * *